3,534,364
ATTITUDE SENSING SYSTEM
Thomas M. Burford, Madison, N.J., assignor to Bell Telephone Laboratories, Incorporated, Murray Hill, N.J., a corporation of New York
Filed Sept. 12, 1966, Ser. No. 578,593
Int. Cl. B64g 3/00
U.S. Cl. 343—100                              2 Claims

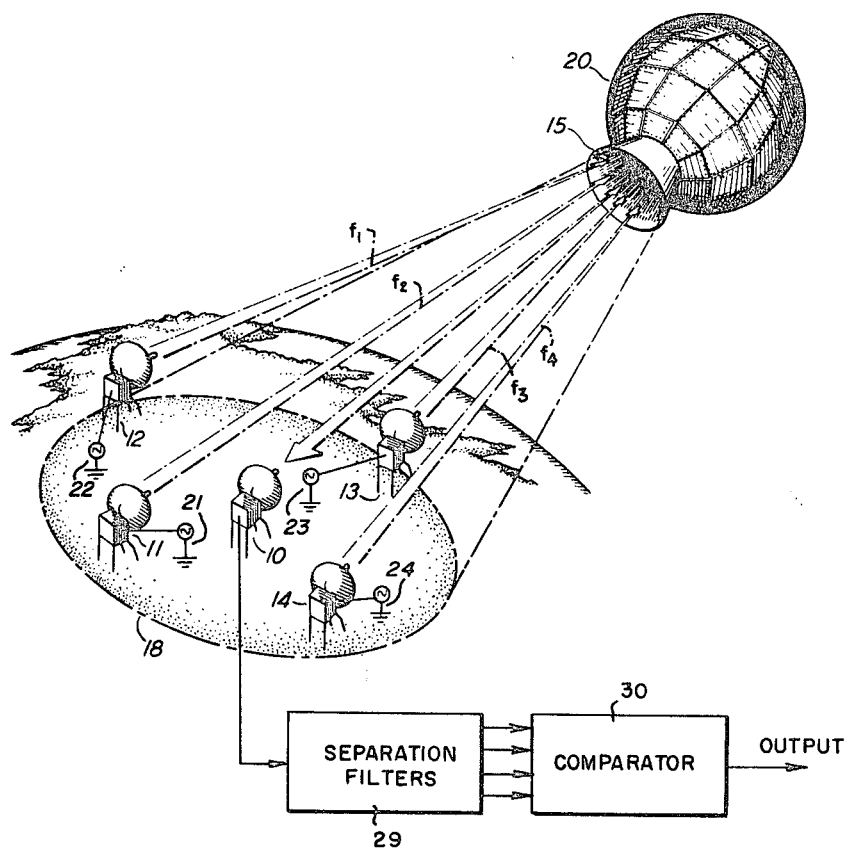

ABSTRACT OF THE DISCLOSURE

A ground station determines the attitude of a synchronous satellite by transmitting a separate distinguishable signal from each of a plurality of generators and receiving the satellite reply signals. The plurality of received signals are separated and compared on the basis of power level in order to obtain the satellite attitude.

---

This invention relates to sensing systems and more particularly to systems for sensing the attitude of a body relative to some frame of reference.

It is often necessary to maintain the spatial orientation of one system element with respect to another. A now common example of a system with such requirements is an earth satellite communication system. One of the more promising techniques currently being employed for this purpose includes a satellite which is in a nominally fixed position with respect to the earth, i.e., a synchronous satellite. To realize the potentially high transmission efficiency of a synchronous communication satellite, it is required that the communication facility include directive elements to control the path of propagated energy. This allows rather high gain elements to be employed with an attendant decrease in wasted energy.

One major difficulty encountered in synchronous satellite systems is that natural phenomena disrupt the stationarity of the satellite with respect to the earth. These phenomena, typically in the form of space radiation and debris and nonuniformities in the earth's gravitational and magnetic fields tend to reorient the satellite and thereby misdirect any directional elements that may be present. Such misdirection is likely to disrupt or seriously impair system performance.

An important element of many communication satellite systems is, therefore, that for determining the orientation of the satellite with respect to the earth-bound communication apparatus. Once the present orientation is known, suitable corrective steps can be taken to realign the errant satellite. Many prior attempts have been made to efficiently determine the spatial attitude of a satellite. These include horizon sensing devices, star-gazing apparatus and solar detectors. All of these prior art techniques have associated with them one or more of the limitations inherent in optical-mechanical systems. Especially crucial among these are that they add weight, introduce a large number of components and have limited accuracy under the most general circumstances. It is well-known that the reliability of an already complex system such as a satellite is further grealy reduced by any substantial increase in the number of components.

Still other techniques for attitude sensing have employed radio frequency energy interchange between the satellite and its associated ground station. The well-known Syncom satellite system described, for example, in Gatland, K. W., editor, Telecommunication Satellites, Englewood Cliffs: Prentice-Hall, Inc., 1964, includes means for determining the polarization of the received signal on the earth. This information, taken together with solar sensing is used to ascertain the attitude of the Syncom spin-stabilized satellite. Prior to the present invention, however, no satisfactory all-electronic attitude sensing system has been used which is capable of performing with sufficient accuracy and reliability.

Accordingly, it is an object of the present invention to provide simplified means for determining the attitude of a remote body.

It is another object of the present invention to determine the attitude of a remote body with increased accuracy.

It is another object of the present invention to determine the attitude of a remote body with increased reliability.

It is another object to provide an all-electronic system for determining the attitude of a remote body.

Briefly stated, the present invention provides means whereby an object having a communication faculty is able to ascertain its own attitude by determining the relative strength of each of a plurality of signals transmitted from locations remote from the object. These signals are distinguishable from each other by their frequency or in some other manner.

Depending upon the orientation of the object and the directional patterns of the transmitting and receiving transducers, each signal will be received by the satellite antenna with greater or lesser effective power. With the directional properties of the transducers known, the amount of power received from each signal, relative to that from the other signals, can be immediately related to the orientation of the object.

Other objects and related advantages of this invention will be readily appreciated by reference to the following detailed description when considered in connection with the accompanying drawing in which the figure shows a satellite in communication with a plurality of fixed points on earth.

Referring to the drawing, a satellite 20 is shown receiving signals from a plurality of ground stations 10 through 14. Station 10 is the main communication ground station and is capable of carrying on two-way communications with the satellite. In some cases it may be desirable to have more than one main ground station. Stations 11 through 14 are auxiliary ground stations and for the present discussion will be assumed to have a transmit-only function. Each of the auxiliary ground stations 11 through 14 are taken to have equal power and substantially identical antennas. Signals generators 21–24 serve as sources of signals needed to generate output signals at frequencies $f_1$, $f_2$, $f_3$ and $f_4$ for ground stations 11–14, respectively.

The satellite 20 has affixed to it a highly directional transmit-receive antenna 15 shown schematically in the drawing. It should be understood that the actual antenna employed need bear no physical resemblance to that shown; all that is required is that the antenna have highly directional characteristics. Since the antenna 15 is taken to be both a transmitting and a receiving antenna, the area illuminated by signals originating at the satellite will be the same area from which signals originating on the earth will be received at the satellite. The area 18 shown in the drawing is one possible illumination area for one correctly oriented satellite antenna.

The distance from each of the auxiliary stations 11 through 14 to the satellite is taken for the present discussion to be substantially equal. Likewise, the intervening propagation medium is the same for each auxiliary station. Thus, when the satellite is oriented in the desired direction signals from each of the auxiliary stations 11 through 14 are received at the satellite with equal amplitude. However, when the satellite becomes misoriented to any substantial degree, the signals received from one or more of the auxiliary ground stations 11 through 14 will be received with reduced power or not at all. It may happen that a misoriented satellite may receive an increased amount of power from one or more auxiliary stations, but not from all such stations.

By comparing the power level of signals from each auxiliary station, it is possible to determine which of these stations are more nearly within the desired illumination area. Thus, by calculating the ratio of power levels of signals received from the auxiliary stations, it is possible to determine the orientation of the satellite.

A useful variation of the present invention once again has the illumination area 18 in the drawing centered on the main communication station 10. According to this variation, however, the illumination area is reduced so as to not include some or all of the auxiliary stations 11 through 14 when the satellite is correctly oriented. The satellite antenna aperture is chosen so as to intercept signals from certain auxiliary stations only when a substantial departure from desired attitude has occurred. This embodiment has the advantage that a deviation can be detected merely by noting the presence of a signal from a single auxiliary station rather than by its absolute or relative magnitude. Of course, for more accurate indications of composite angular deviations, a comparison of signal strengths may still be required.

In most satellite communication systems it is necessary to communicate information regarding any misorientation of the satellite back to an earth-bound station so that corrective measures can be taken. This is so because the commands necessary to operate the correction means are often too complicated to be easily generated on board the satellite. In the system described above, all of the apparatus needed to communicate attitude information back to the earth is already present. In fact, all that need be done is to relay the signals received from the auxiliary stations back to the earth by means of the satellite message relay circuitry and station 10. Comparisons which would otherwise be performed at the satellite are then performed by comparator 30 after proper signal separation in separation filters 29. Since the relayed signals will travel only from the satellite to the main communication ground station, each will experience the same attenuation. Thus, it is seen that information directly related to the orientation of the satellite is immediately available at a satellite ground station by merely providing additional ground stations for transmitting distinguishable signals having known directivity. These auxiliary stations need have only relatively simple apparatus compared to the main communication ground station.

The actual reorientation of a satellite to establish correct attitude will ordinarily be accomplished using rockets or other well-known means. The information regarding relative signal strengths can be used in at least two ways. First, the exact signal-strength ratios can be used to calculate the precise rocket impulse needed to return the satellite to its desired orientation within a specified time interval. Alternately, the signal-strength ratios can be monitored to determine when the rotation about some axis has exceeded some allowable amount. When this threshold deviation is reached a standard impulse is generated to compensate for it. A subsequent observation can then determine if that impulse has been sufficient, or more than sufficient, to restore the satellite to within its allowable range of deviation. In either of these schemes, the satellite may be in constant rotation about each axis.

Certain of the restrictions given above for purposes of simplifying the discussion may be easily eliminated or compensated for. For instance, the auxiliary stations antennas need not be isotropic radiators nor have any prescribed directional properties. Indeed, any type of radiator can be used and compensated for if prelaunch calibration is performed to determine the actual directional patterns of the antenna systems. Of course, to determine the desired attitude information with utmost efficiency, some degree of directivity may be desired, provided that it is consistent with other system constraints. A similar compensation can be made for any path length differences resulting from known variations from planarity that may exist for the earth at the points where the ground stations are located. Similarly, if the auxiliary station frequencies are significantly different, the attendant variations in attenuation that they may encounter can easily be accounted for. Although the satellite is shown in the drawing to have a common transmit-receive antenna, separate antennas could be provided for each function. In fact, more than a signal antenna may be required for either or both functions.

It was implied in the above discussion that the auxiliary ground stations were symmetrically located with respect to the main communication ground station. This also is not essential. A wide latitude is allowed in the placement of the auxiliary ground stations. In fact, if the satellite were to be communicating with two or more widely separated main ground stations, the auxiliary stations could be distributed between or among them. Of course, in this case, some compensation may have to be made for variations in propagation media.

Although four auxiliary ground stations are shown in the drawing, certain applications may require a greater or smaller number of such stations. There will also be conditions under which the main ground station can be employed to perform the function of an auxiliary station, thereby reducing the number of auxiliary stations required.

In the above-described embodiment, reference was made only to a system wherein the satellite maintained a nominally fixed position relative to the earth. By the simple expedient of having the auxiliary stations equipped with a scanning capability, satellites with relative motion could be accommodated as well. Such a modification to the basic system would, of course, involve considerably greater complexity at the main ground station to provide for the computation of the constantly changing desired orientation.

It has been assumed in the above discussion that the auxiliary signals are simple sinusoids or the like. There is no limitation inherent in the present invention that would prevent the auxiliary signals from being modulated themselves. In particular, the auxiliary signals could bear useful message or supervisory information.

Although the drawing shows a correctly oriented satellite to be equally illuminating all of the auxiliary transmitting stations (thereby causing each of the auxiliary station signals to be received with equal power), no such limitation is fundamental to the present invention. Any set of known relative received signal levels could correspond to the normal state of orientation. This flexibility is especially important if the preferred orientation is not fixed for all time or if one or more of the transmitted signals undergoes a predetermined amount of reflection from other objects.

An alternate embodiment of the present invention reverses the roles played by the satellite and the auxiliary ground stations. The ground stations have receivers instead of transmitters. These ground-based receivers are responsive to signals transmitted from the satellite, whether they be message signals or separate pilot tones. The relative levels received at each of the receiver locations provides an indication of the satellite orientation. The levels can be simultaneously and continuously monitored at a central point, such as the main ground station. Comparator 30 in the drawing may be employed to make any desired comparisons. Alternately, upper and lower thresholds can be set with an indication given upon their violation. These thresholds may be made adjustable to compensate for attenuation variations from one station to another and with atmospheric and other changes. The number of auxiliary stations can be reduced if the satellite is provided with a plurality of variously-directed directional antennas. An advantage of this alternate embodiment is that the auxiliary stations need not handle the high power levels associated with transmitting stations.

There are many other situations, including some not involving communication satellites, where it is desired to sense the orientation of an object relative to some fixed reference system. An obvious example of this is that involving an object under water. Here it might prove advantageous to employ acoustic waves instead of the radio frequency electromagnetic waves used in the case of the satellite. Because of the multipath nature of an underwater channel, some signal averaging circuitry will have to be applied to each received signal.

The above embodiments are by no means meant to exhaust the possible variations implicit within the spirit of the present invention. Other equivalent variations and embodments will occur to those skilled in the art.

What is claimed is:
1. The method for sensing the orientation of an object remote from a reference system comprising the steps of
   (1) transmitting distinguishable signals from a plurality of transmitting stations having known positions relative to said reference system,
   (2) receiving one or more of said signals by means of directional signal receiving means affixed to said object,
   (3) relaying an indication of each of said received signals to a receiving station having known position relative to said reference system, and
   (4) comparing said indications at said receiving station.
2. An attitude sensing system comprising
   a plurality of transmitting stations whose locations are fixed in a frame of reference, each of said stations generating distinguishable signals,
   a receiving station fixed in said reference frame,
   a remote object comprising directional receiving means uniquely corresponding to said transmitting stations, said directional receiving means comprising means arranged to receive each of said distinguishable signals with known relative amplitude when said object is at its correct attitude, said remote object additionally comprising directional transmitting means for relaying said received distinguishable signals to said fixed receiving station,
   a comparator located at said receiving station for comparing the relative amplitudes of each of said distinguishable signals relayed by said object.

References Cited
UNITED STATES PATENTS

| | | | |
|---|---|---|---|
| 1,433,070 | 10/1922 | Conners | 343—102 |
| 2,204,438 | 6/1940 | Neufeld | 343—102 |
| 2,398,335 | 4/1946 | Theis et al. | 343—101 |
| 3,242,494 | 3/1966 | Gicca | 343—100 |
| 3,137,853 | 6/1964 | Cutler | 343—100 |
| 3,144,606 | 8/1964 | Adams et al. | 343—100 |
| 3,234,551 | 2/1966 | Giger | 343—100 |
| 3,262,116 | 7/1966 | Hutchinson et al. | 343—100 |

RODNEY D. BENNETT, Jr., Primary Examiner

M. F. HUBLER, Assistant Examiner

U.S. Cl. X.R.

325—15